United States Patent [19]

Papadopoulos et al.

[11] Patent Number: 5,768,254

[45] Date of Patent: Jun. 16, 1998

[54] MULTIPLE ACCESS CELLULAR COMMUNICATION WITH SIGNAL CANCELLATION TO REDUCE CO-CHANNEL INTERFERENCE

[75] Inventors: Haralabos C. Papadopoulos, Cambridge, Mass.; Carl-Erik Wilhelm Sundberg, Chatham, N.J.

[73] Assignee: Lucent Technologies Inc., Murray Hill, N.J.

[21] Appl. No.: 536,554

[22] Filed: Sep. 29, 1995

[51] Int. Cl.$^6$ ............................. H04Q 7/30; H04J 3/10
[52] U.S. Cl. .................. 370/201; 370/337; 455/452; 455/501
[58] Field of Search .................. 455/50.1, 56.1, 455/63, 65, 70, 422, 450, 452, 501, 524; 375/285, 296; 370/294, 328, 329, 336, 337, 345, 347, 442, 201, 277, 280, 282, 291

[56] References Cited

U.S. PATENT DOCUMENTS

| | | | |
|---|---|---|---|
| 2,396,883 | 3/1946 | Robinson | 455/501 |
| 3,984,774 | 10/1976 | Hart | 455/63 |
| 4,434,505 | 2/1984 | Gutleber | 455/501 |
| 4,841,521 | 6/1989 | Amada et al. | 370/296 |
| 4,949,335 | 8/1990 | Moore | 370/280 |
| 4,979,170 | 12/1990 | Gilhousen et al. | 370/321 |
| 4,987,571 | 1/1991 | Haymond et al. | 370/445 |
| 5,025,442 | 6/1991 | Lynk et al. | 370/280 |
| 5,117,423 | 5/1992 | Shepherd et al. | 370/280 |
| 5,185,739 | 2/1993 | Spear | 370/337 |
| 5,200,956 | 4/1993 | Pudney et al. | 370/280 |
| 5,343,495 | 8/1994 | Lovell et al. | 455/501 |
| 5,420,851 | 5/1995 | Seshadri et al. | 370/280 |
| 5,430,761 | 7/1995 | Bruckert et al. | 455/501 |
| 5,444,698 | 8/1995 | Kito | 370/336 |
| 5,629,929 | 5/1997 | Blanchard et al. | 370/201 |
| 5,671,247 | 9/1997 | Souissi et al. | 375/367 |

OTHER PUBLICATIONS

Amitay, N., and Nanda, S., "Resource Auction Multiple Access (RAMA) for Statistical Multiplexing of Speech in Wireless PCS," in ICC'93, Conf. Rec., (Geneva, Switzerland), May 1993, pp. 605–609.

Brady, P.T., "A Model for Generating On–Off Speech Patterns in Two-Way Conversation," Bell Syst. Tech. Jour., vol. 48, No. 7, Sep. 1969, pp. 2445–2472.

Bursh, Jr., T.P., et al., "Digital Radio for Mobile Applications," AT&T Technical Journal, Jul./Aug. 1993, pp. 19–26.

Chang, J.J.C., et al., "Wireless Systems and Technologies: An Overview," AT&T Technical Journal, Jul./Aug. 1993, pp. 11–18.

Cox, D.C., "Universal Digital Portable Radio Communications," Proc. IEEE, vol. 75, No. 4, Apr. 1987, pp. 436–477.

(List continued on next page.)

Primary Examiner—Benedict V. Safourek

[57] ABSTRACT

A method and system for reducing co-channel interference (CCI) in multiple access communication by providing complete or partial cancellation of a mixed CCI interfering signal in a system base station. An exemplary system includes first and second base stations communicating with users in first and second cells, respectively. The first base station transmits a downlink signal to a user in the first cell. The downlink signal is also a mixed CCI interfering signal in that it interferes with reception of an uplink signal in the second base station. A cancellation signal representative of the interfering signal is supplied along a transmission path from the first base station to the second base station. The second base station utilizes the cancellation signal to reduce the effect of the interfering signal on a received composite signal by, for example, combining the cancellation signal or a suitably processed version thereof with the received composite signal. Other aspects of the invention involve reducing mixed CCI by providing non-uniform quality of service, by dropping potentially interfering packets, or by full or partial circular interleaving of packet slot assignments.

26 Claims, 4 Drawing Sheets

OTHER PUBLICATIONS

Cox, D.C., et al., "New Directions in Subband Coding," IEEE J. Select. Areas Commun. (Special Issue on Voice Coding for Communications), vol. SAC–6, No. 2, Feb. 1988, pp. 391–409.

Gerson, I.A., and Jasiuk, M.A., "Vector Sum Excited Linear Prediction (VSELP) Speech Coding at 8 Kbps," ICASSP'90, Albuquerque, Apr. 1990, pp. 461–464.

Gilhousen, K.S., et al., "On the Capacity of a Cellular CDMA System," IEEE Trans. on Veh. Tech., vol. 40, No. 2, May 1991, pp. 303–312.

Goodman, D.J., "Cellular Packet Communications," IEEE Trans. on Commun., vol. COM–38, No. 8, Aug. 1990, pp. 1272–1280.

Goodman, D.J., "Embedded DPCM for Variable Bit Rate Transmission," IEEE Trans. on Commun., vol. COM–28, No. 7, Jul. 1980, pp. 1040–1046.

Goodman, D.J., "Second Generation Wireless Information Networks," IEEE Transactions on Vehicular Technology, vol. 40, No. 2, May 1991, pp. 366–374.

Goodman, D.J., and Sundberg, C–E.W., "Transmission Errors and Forward Error Correction in Embedded Differential Pulse Code Modulation," Bell Syst. Techn. Jour., vol. 62, No. 9, Nov. 1983, pp. 2735–2764.

Goodman, D.J., et al., "Packet Reservation Multiple Access for Local Wireless Communications,"IEEE Transactions on Communications, vol. 37, No. 8, Aug. 1989, pp. 885–889.

Goodman, D.J., et al., "Waveform Substitution Techniques for Recovering Missing Speech Segment in Packet Voice Communications," IEEE Trans. on ASSP, vol. ASSP–34, No. 6, Dec. 1986, pp. 1440–1448.

Grillo, D., Macamee, G., "European Perspectives on Third Generation Personal Communication Systems,"40th IEEE Vehicular Tech. Conf., Orlando, May 1990, Conf. Rec. pp. 135–140.

Gruber, J., and Strawczynski, L., "Subjective Effects of Variable Delay and Speech Clipping in Dynamically Managed Voice Systems," IEEE Trans. on Commun., vol. COM–33, No. 8, Aug. 1985, pp. 801–808.

Hagenauer, J., et al., "The Performance of Rate–Compatible Punctured Convolutional Codes for Digital Mobile Radio," IEEE Trans. on Commun., vol. COM–38, No. 7, Jul. 1990, pp. 966–980.

Lam, S.S., "Packet Broadcast Networks—A Performance Analysis of the R–ALOHA Protocol," IEEE Transactions on Computers, vol. C–29, No. 7, Jul. 1980, pp. 596–603.

MacDonald, V.H., "The Cellular Concept," Bell System Technical Journal, Vol. 58, No. 1, Jan. 1979, pp. 15–41.

Mallinder, B.J.T., "An Overview of the GSM System," Third Nordic Seminar on Digit Land Mobile Radio Communications, Copenhagen, Denmark, Sep. 1988, Conf. Rec. pp. 3.1.1–3.1.13.

Miki, T., et al., "Pseudo–Analog Speech Transmission in Mobile Radio Communication Systems," Reprinted from IEEE Transactions on Vehicular Technology, vol. 42, No. 1, Feb. 1993, pp. 69–77.

Nanda, S., and Yue, O–C., "Variable Partition Duplexing for Wireless Communications,"GLOBECOM'91, Phoenix, Arizona, Nov. 1991, Conf. Rec. pp. 32.6.1–32.6.7.

Ochsner, H., "DECT—Digital European Cordless Telecommunications," 39th IEEE Vehicular Tech. Conf., San Francisco, California, May 1989, Conf. Rec. pp. 718–721.

Ohno, K., and Adachi, F., "QDPSK Signal Transmission Performance with Postdetection Selection Diversity Reception in Land Mobile Radio," IEEE Trans. on Veh. Tech., vol. VT–40, No. 3, Nov. 1991, pp. 798–804.

Papadopoulos, H.C., and C.–E.W. Sundberg, "Impact of Runlenghs of Dropped Packets in Shared Time Division Duplexing (STDD)," ICC '95, Seattle, WA, Jun. 1995, 5 pages.

Papadopoulos, H.C., and C.–E.W. Sundberg, "Reduction of Mixed Co–channel Interference in Microcellular Shared Time Division Duplexing (STDD) Systems," In submission, IEEE VT Trans., Jun. 1995, pp. 1–33.

Papadopoulos, H.C., and C.–E.W. Sundberg, "Reduction of Mixed Co–channel Interference in Microcellular STDD Systems,"IEEE Vehicular Technology Conference, Chicago, Illinois, Jul. 1995, 5 pages.

Papadopoulos, H.C., and C.–E.W. Sundberg, "Shared Time Division Duplexing (STDD): Impact of Runlengths of Dropped Packets and Fast Speech Activity Detection," In submission, IEEE VT Trans., Jun. 1995, (Presented in part at the International Conference of Communications, Seattle, WA, Jun. 1995), pp. 1–46.

Papadopoulos, H.C., and C.–E.W. Sundberg,, "Shared Time Division Duplexing (STDD) with Fast Speeech Activity Detection," PIMRC '95, Toronto, Sep. 1995, 5 pages.

Paratz, L.M., and Jones, E.V., "Speech Transmission Using an Adaptive Burst Mode Technique," IEEE Transmission on Communications, vol. COM–33, No. 6, Jun. 1985.

Seshadri, N., et al., "Advanced Techniques for Modulation, Error Correction, Channel Equalization, and Diversity," AT&T Technical Journal, Jul./Aug. 1993, pp. 48–63.

Steele, R., "The Cellular Environment of Lightweight Handheld Portables," IEEE Commun. Mag., vol. 28, No. 7, Jul. 1990, pp. 20–29.

Sundberg, C–E., W., and Seshadri, N., "Digital Cellular Systems for North America," IEEE Global Telecommunications Conference & Exhibition, GLOBECOM'90, vol. 1, *Communications: Connecting the Future*, San Diego, CA, Dec. 2–5, 1990.

Swain, R.S., and Holmes, D.W.J., "The Digital Cordless Telecommunication Common Air Interface," British Telecom Tech. Jour., vol. 8, No. 1, Jan. 1990, pp. 12–18.

Wong, W.C, and Kuek, S.S., "Analytical Model for Variable Partition Duplexing," Electronic Letters, vol. 29, Aug. 1993, pp. 1513–1514.

Wong, W.C., et al., "Low Delay, High Quality Wireless Digital Speech Communications by Shared Time Division Duplexing," GLOBECOM'93, Conf. Proc., Houston, TX, Nov. 1993, 5 pages.

Wong, W.C., et al., "Shared Time Division Duplexing: An Approach to Low–Delay High–Quality Wirless Digital Speech Communications," Reprinted from IEEE Transactions on Vehicular Technology, vol. 43, No. 4, Nov. 1994, pp. 934–945.

Wong, W.C., et al., "STDD, An Approach to Low Delay, High Quality Wireless Speech Communications," IEEE 44th Vehicular Technology Conference, vol. 1, Conf. Proc., Stockholm, Sweden, Jun. 8–10, 1994, pp. 316–320.

5,768,254

1

MULTIPLE ACCESS CELLULAR COMMUNICATION WITH SIGNAL CANCELLATION TO REDUCE CO-CHANNEL INTERFERENCE

TECHNICAL FIELD

The present invention relates to multiple access communication systems. More particularly, the present invention relates to wireless multiple access communication systems which dynamically allocate available frame slots to uplink and downlink communication, and reduction of co-channel interference (CCI) in such systems.

BACKGROUND OF THE INVENTION

FIG. 1 illustrates the components of a multiple access cellular communications system. Cell 102 represents a portion of the geographic area served by the system. Within each cell is a base station 105 which is connected to the wired public telephone network. Base station 105 establishes a wireless link with mobile users 110-i, i=1, ... N, wishing to transmit and receive analog or digital information representing, for example, text, speech, video, facsimile, electronic images, modem signals, internet communications and the like, via the public telephone network. The wireless link between any given user 110-i and base station 105, is comprised of an uplink $U_i$ for transmitting information from user 110-i to base station 105 and then to the telephone network and of a downlink $D_i$ for transmitting information received by base station 105 from the telephone network to user 110-i.

Multiple access techniques regulate communications for the various users within a cell given a limited available bandwidth. Exemplary multiple access techniques include TDMA (time-division multiple access) with FDD (frequency-division duplexing) as in the pan-European GSM system (now also known as Global System for Mobile Communication) and the North American IS-54 system, or a variant, TDMA/TDD (time-division duplexing), as in the Digital European Cordless Telecommunications (DECT) system.

In these and other TDMA systems, frames of time are generally the basic transmission unit. Each frame is divided into a plurality of slots of time. Some slots are used for control purposes and some slots are used for information transfer as described below. The information is transmitted during slots in the frame where slots are assigned to a specific user. Throughout this disclosure, it is understood that the term "information" refers to data representing speech, text, video or the like in either analog or digital form.

In a TDMA/TDD system, a given frame with 2N information slots is divided into an uplink (mobile-to-base) section and a downlink (base-to-mobile) section, each with N slots. A given slot is thus assigned to either uplink or downlink communication. Although this assignment of slots provides the uplink and downlink for each user with a guaranteed transmission slot, the resulting system capacity is relatively low since a slot is assigned to each user and no re-allocation of slots is performed if a user decides not to utilize an assigned slot within a predetermined time interval.

U.S. Pat. No. 5,420,851, assigned to the assignee of the present invention and incorporated by reference herein, discloses an exemplary multiple access technique, referred to as TDMA/STDD (shared time-division duplexing) which provides significant improvements over the above-described TDMA/TDD technique. FIG. 2 shows an exemplary TDMA/STDD frame 201 in which slots are dynamically allocated between uplink and downlink, for example, on a frame-by-frame basis. Frame 201 is divided into four sections. Call management functions are handled by separate uplink and downlink slots in uplink control section 205 and downlink control section 207, respectively. The remainder of frame 201 is divided into S slots, $S=U_S+D_S+A$, with $U_S$ slots allocated for uplink information transfer, $D_S$ slots allocated for downlink information transfer, and A representing the number of slots, if any, not allocated. In frame 201 of FIG. 2, A=0.

The number of slots allocated between uplink section 210 and downlink section 215 can vary with each frame as indicated by partition 212. However, the total number of speech slots S remains fixed for every frame. When there are relatively few users in the system and the total number of slots in any one direction is less than S/2, the allocation of information slots corresponds to standard TDD with the S slots equally partitioned for uplink and downlink access. When the number of users increases and the number of required speech slots in either direction exceeds S/2, the location of partition 212 between the uplink and downlink slots varies according to demand. If more than S/2 slots are required in both directions, S/2 users are served in each direction and the rest are dropped. Additional detail regarding STDD may be found in the above-cited U.S. Pat. No. 5,420,851.

Although STDD can provide considerable improvements in wireless communication systems, performance may be limited in certain embodiments by factors such as co-channel interference (CCI). U.S. Pat. No. 5,594,720, entitled "Multiple Access Cellular Communication with Dynamic Slot Allocation and Reduced Co-channel Interference," assigned to the assignee of the present invention and incorporated by reference herein, discloses a number of techniques for reducing "mixed" CCI. Mixed CCI involves, for example, a downlink signal from a base station in a given cell interfering with reception of an uplink signal from a mobile user in a neighboring frequency reuse (FR) cell, where an FR cell is defined as a cell sharing at least one common channel carrier frequency with the given cell. An exemplary reduction technique disclosed in the U.S. Pat. No. 5,594,720 application minimizes mixed CCI using base station directional antennas in conjunction with a frame organization that assigns frame slots to particular directional antennas.

Another multiple access technique described in U.S. Pat. No. 5,594,720 is referred to as TDMA/PSTDD (partially-shared time-division duplexing). FIG. 3 shows an exemplary PSTDD frame 301 with uplink and downlink control sections 305, 307, uplink and downlink information sections 310, 315 and a group of shared slots 320. The shared slots 320 represent a subset of the total number of available information transmission slots in the frame 301. The uplink and downlink sections 310, 315 contain slots which are permanently allocated to uplink and downlink information transmission, respectively. The shared slots 320 are dynamically allocated between uplink and downlink transmission in accordance with demand, in a manner similar to the allocation of slots in sections 210 and 215 of FIG. 2. In the exemplary frame 301, therefore, only a subset of the total available information slots are dynamically allocated, while the remaining information slots are assigned to either uplink or downlink transmission. By dynamically allocating only a subset of the available slots, PSTDD reduces the potential for mixed CCI.

Although the above-described directional antenna and PSTDD techniques provide substantial reduction in CCI, there is a need for alternative techniques which provide reduced CCI in, for example, systems utilizing omnidirectional antennas or basic TDMA/STDD.

SUMMARY OF THE INVENTION

The present invention provides a method and apparatus for reducing co-channel interference (CCI) in a TDMA system by providing for complete or partial cancellation of a mixed CCI interfering signal in a system base station.

One aspect of the invention is directed to a multiple access communication system in which mixed CCI is reduced by separately transmitting a cancellation signal, corresponding to or otherwise representative of the interfering signal, from an interfering base station to an interfered-with base station. In the interfered-with base station, the cancellation signal is used to cancel or otherwise offset the mixed CCI interference produced in a received composite signal which includes both the desired mobile-to-base uplink signal and the interfering signal.

An exemplary communication system in accordance with the invention includes first and second base stations communicating with users in first and second cells, respectively. The first base station generates an interfering signal which is received as mixed CCI in the second base station. The interfering signal is received in the second base station as one component of a received composite signal which also includes an uplink information signal component. A signal transmission path between the first and second base stations supplies a cancellation signal representative of the interfering signal to the second base station. The second base station then utilizes the cancellation signal to reduce the effect of the interfering signal on the received composite signal. This may be carried out by adjusting the cancellation signal for variations present in the received interfering signal, and then combining the resulting processed cancellation signal with the received composite signal. The cancellation and composite signals may be at RF, IF or baseband frequencies.

The transmission path of the cancellation signal may be, for example, a wired connection such as a coaxial or fiber optic cable, a point-to-point wireless radio link, or a dial-up ISDN connection. The cancellation signal may be a duplicate of the interfering signal, or a digital information signal setting forth characteristics of the interfering signal, or any other signal suitable for offsetting the effects of the interfering signal on the received composite signal.

In accordance with another aspect of the invention, the signal path for the cancellation signal may include a multipath filter such that multipath effects on the interfering signal are substantially reproduced in the cancellation signal. The cancellation signal path may also include gain and timing adjustment elements to ensure that the cancellation and composite signals are substantially matched in amplitude and phase before the cancellation operation is carried out.

In accordance with a further aspect of the invention, a method for communicating information in slots of a frame is provided. The method includes providing first and second base stations communicating with users in first and second cells, respectively. The method determines if a downlink signal from the first base station can potentially interfere with reception of an uplink signal in the second base station. In the event of potential interference, the method controls the signal transmission in at least one of the first and second base stations to reduce the likelihood that the downlink signal will interfere with the uplink signal.

The step of controlling the signal transmission may involve implementing a non-uniform quality service in which users paying a higher usage fee are assigned a more favorable slot position in an STDD or PSTDD frame. Another alternative involves directing the interfering first base station to drop a downlink signal packet if a mobile user transmitting an uplink packet to the second base station is paying a higher usage fee. Furthermore, full or partial circular interleaving of frame slots could be implemented by the system controller in order to reduce the run length of packets experiencing mixed CCI, in a manner similar to that described in U.S. Pat. No. 5,602,836, assigned to the present assignee.

The signal cancellation techniques of the present invention can reduce the impact of CCI resulting from, for example, shared uplink and downlink slots in neighboring frequency reuse (FR) cells of an STDD or PSTDD cellular communication system. In other embodiments, directional antennas may be used in place of omnidirectional antennas in the system base stations. With directional antennas, the full STDD frame may be utilized by different users in each direction, thereby increasing system capacity relative to the omnidirectional case.

The above-discussed features, as well as additional features and advantages of the present invention, will become apparent by reference to the following detailed description and accompanying drawings.

DETAILED DESCRIPTION

Figure 1:
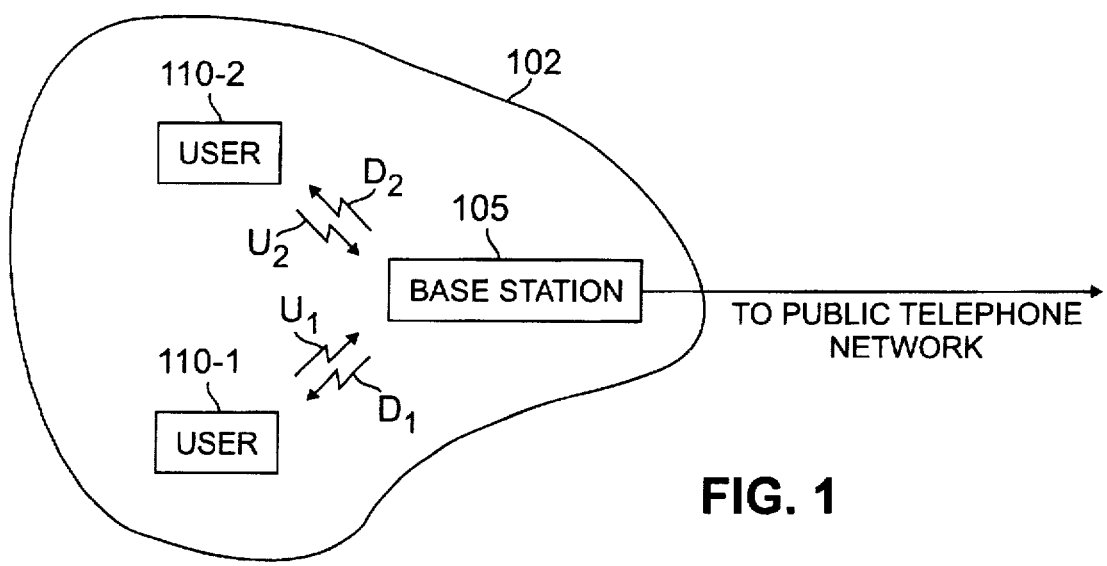
FIG. 1 illustrates the components of a cellular communication system.
Figure 2:
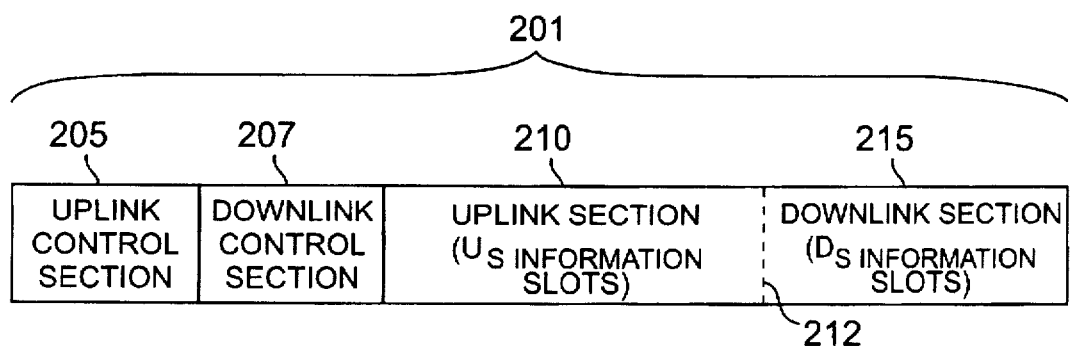
FIG. 2 is a diagram of a Shared Time-Division Duplexing (STDD) frame format.
Figure 3:
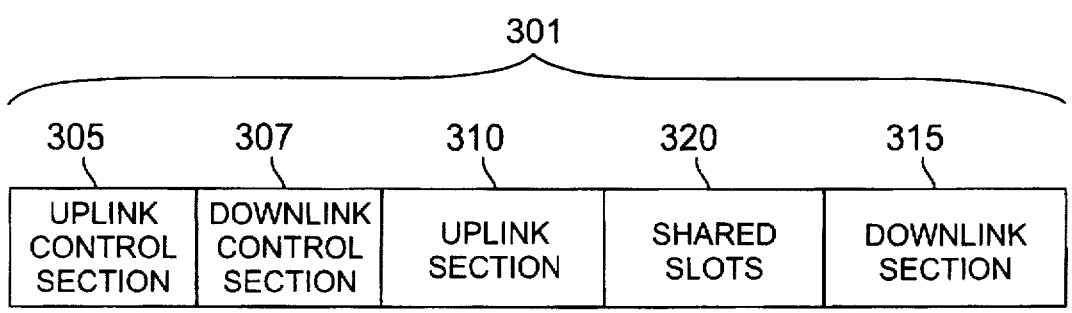
FIG. 3 is a diagram of a partially-shared time-division duplexing (PSTDD) frame format.
Figure 4:
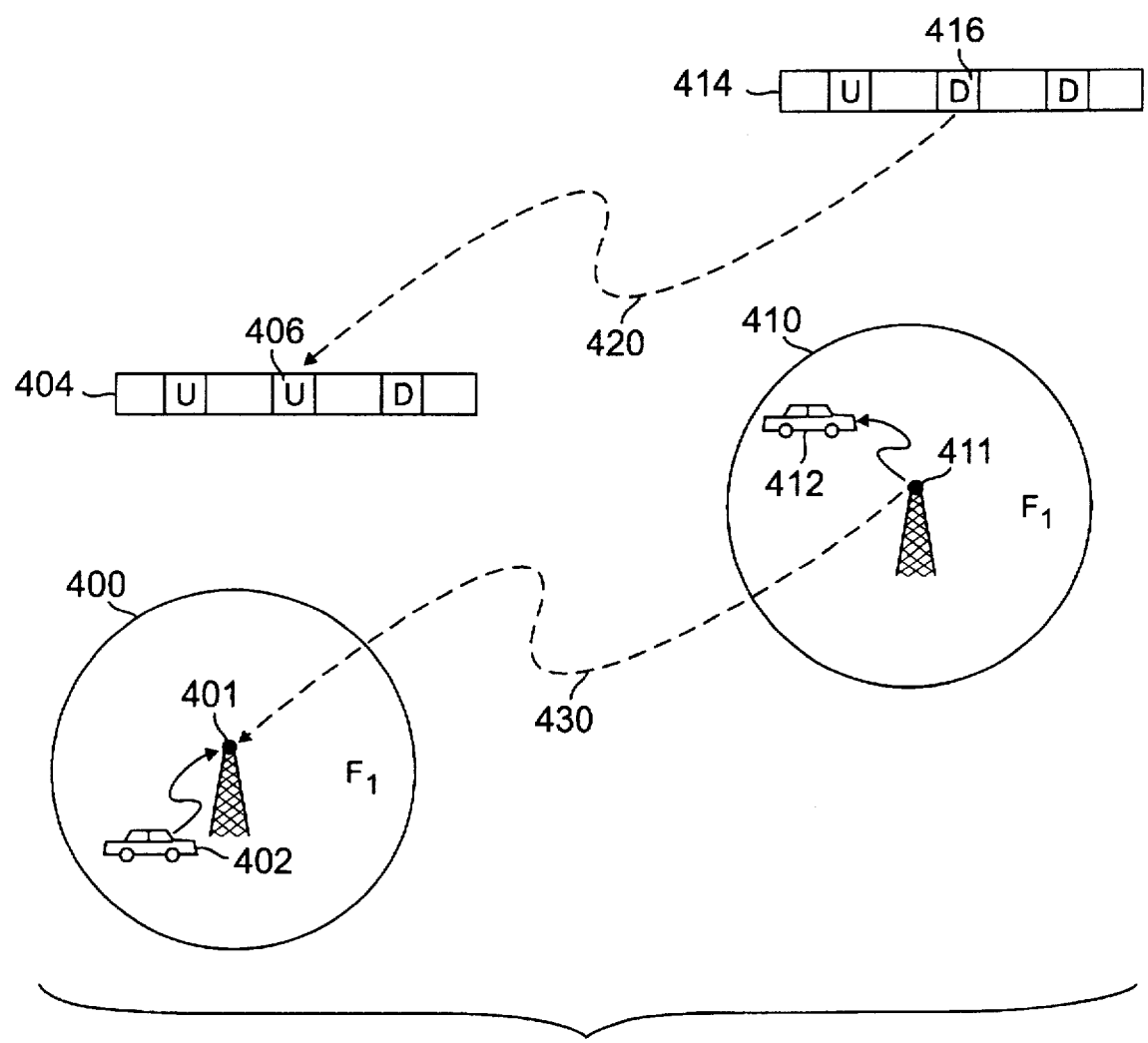
FIG. 4 illustrates "mixed" co-channel interference (CCI) in an exemplary STDD communication system.

FIG. 4 illustrates an exemplary type of CCI which may arise in a TDMA/STDD cellular communication system. A first cell 400 includes a base station 401 for transmitting downlink information to and receiving uplink information from a mobile user 402. The cell 400 operates at a channel carrier frequency F1. The user 402 may transmit an uplink packet to base station 401 at carrier frequency F1 in a frame 404. The frame 404 includes one or more uplink time slots, such as slot 406, which are dynamically allocated to the user 402 in accordance with an STDD technique such as that described in the above-cited U.S. Pat. No. 5,420,851.

A second cell 410 includes a base station 411 for communicating with users within the cell 410. The cell 410 also operates at a channel carrier frequency F1 and cells 400 and 410 are therefore referred to herein as neighboring frequency reuse (FR) cells. A mobile user 412 in cell 410 may receive a downlink packet from the base station 411 in a frame 414. The downlink packet is transmitted in one or more time slots of frame 414, such as slot 416, which are dynamically allocated to the user 412 in accordance with an STDD or PSTDD technique. Both the mobile users 402, 412 and the base stations 401, 411 are equipped with omnidirectional antennas in this example. Unlike a TDD technique in which fixed time slots are allocated to uplink and downlink transmission, an STDD or PSTDD technique allows time slots to be dynamically allocated to either uplink or downlink transmission in accordance with demand.

FIG. 4 shows that the user 402 may therefore be transmitting information in uplink slot 406 to base station 401 during the same time period that base station 411 in neighboring FR cell 410 is transmitting in downlink slot 416 to user 412. Because signals transmitted from a base station are typically at a significantly higher power level than signals transmitted from a mobile user, the downlink signal transmitted in slot 416 can interfere with the uplink signal transmitted in slot 406. The interference between frame time slots 416 and 406 is indicated in FIG. 4 by dashed line 420. The interfering signal is indicated by dashed line 430. Because this type of CCI involves a high power downlink signal 430 from a base station interfering with reception of a lower power uplink signal from a mobile user, it is referred to herein as "mixed" CCI. In certain cases this type of interference may produce a received signal-to-interference ratio (S/I) at base station 401 that results in a dropped packet in uplink time slot 406. Mixed CCI in an STDD or PSTDD system can thus significantly increase the packet-dropping rate and thereby reduce system capacity. It should be noted that mixed CCI can also involve an uplink signal from one mobile user interfering with another user's reception of a downlink signal transmitted by a base station in the same time slot. The latter type of mixed CCI is usually not a serious problem due to the fact that base station transmitting power is typically much higher than that of the interfering mobile user.

Mixed CCI generally does not arise in properly-synchronized TDMA/TDD and TDMA/TDD/SAD systems. However, these systems can exhibit "regular" CCI arising from, for example, interference between two different downlink signals or between two different uplink signals in neighboring FR cells. Regular CCI is common to most cellular systems which utilize frequency reuse to expand system capacity. Typically, the distance between neighboring FR cells is selected such that regular CCI is at or below an acceptable level, since the received power at the base station is directly related to transmitter distance. If mixed CCI can be controlled or eliminated, the remaining regular CCI in an STDD system would generally be no greater than that in conventional TDMA/TDD and TDMA/TDD/SAD systems.

Figure 5:
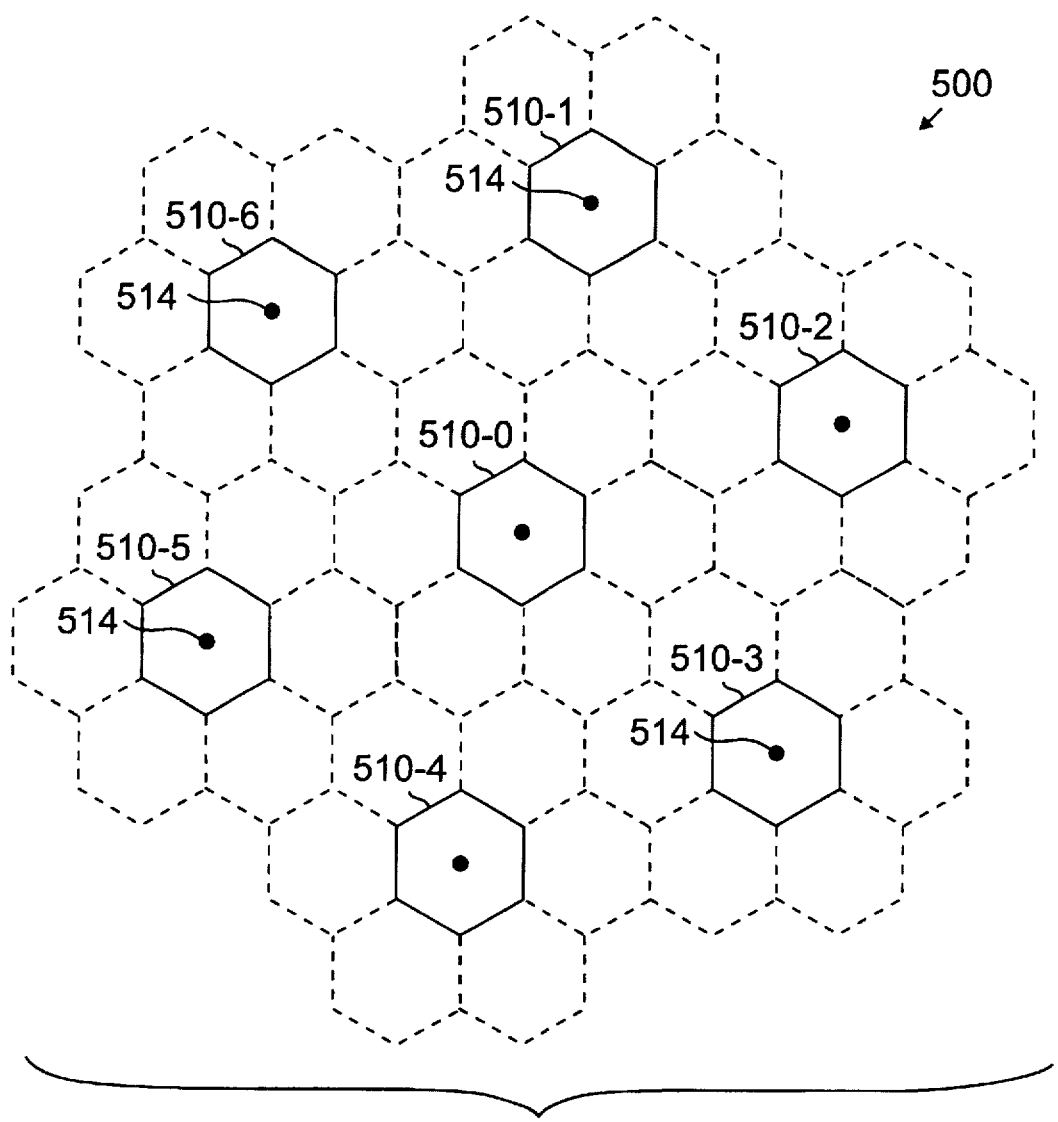
FIG. 5 is a diagram of neighboring FR cells in an exemplary cellular communication system.

FIG. 5 shows an exemplary cellular communication system 500 in which the above-described mixed CCI may arise. The geographic area serviced by system 500 is divided into cells which are arranged in a hexagonal pattern based on cell groups in which six cells surround a center cell. For clarity of illustration only a portion of the cells in the system 500 are shown. A number of FR cells 510-i are shown in solid outline. Each of the FR cells 510-i shares at least one common channel carrier frequency. The cells 510-i thus represent a subset of the total number of cells within the system 500. Other cells which utilize different channel carrier frequencies are located adjacent each of the FR cells 510-i and several are shown in dashed outline. Each cell includes a base station 514 which communicates with users in that cell via an omnidirectional antenna or a suitable group of directional antennas. Additional detail regarding the use of directional antennas in combination with a suitable frame organization to reduce mixed CCI can be found in the above-cited U.S. Pat. No. 5,594,720. Mobile users within the geographic area serviced by system 500 can communicate with each other and a public telephone network via base stations 514. The particular cell pattern shown in system 500 is illustrative only and the present invention may be utilized in systems with any of a number of other cell patterns.

The FR cells 510-1 through 510-6 surrounding a given cell 510-0 are its neighboring FR cells, also referred to herein as "first tier" potential interferers of the given cell 510-0. There are a total of six first tier potential interferers for each FR cell 510-i in the exemplary seven-cell hexagonal FR pattern of FIG. 5. Downlink signals from the neighboring FR cells of a given FR cell can produce mixed CCI within the given cell in the manner described previously. The seven-cell hexagonal pattern typically repeats such that an outer cell 510-i in one seven-cell group is also a central cell in another seven-cell group in the system. As used herein, the term "neighboring FR cell" is intended to include any cell which can produce CCI in a given cell, and thus includes not only first tier interferers but also cells located further from the given cell. Of course, the strength of the mixed CCI interfering signal decreases as a function of the distance of the interfering cell from the given cell, such that first tier interferers generally produce the most significant interference in the given cell.

The present invention provides a number of techniques which can be used to reduce mixed CCI in an STDD system by separately transmitting a known interfering signal or a suitable analog or digital representation thereof to a particular interfered-with base station or base stations, and then using the separately-transmitted signal to cancel or reduce the interference in the actual received signal at the base station. Although the interference reduction techniques are described herein in conjunction with an exemplary type of STDD, it will be readily apparent to those skilled in the art that the techniques are more generally applicable to any multiple access communication system in which uplink and downlink slots are dynamically allocated.

Figure 6:
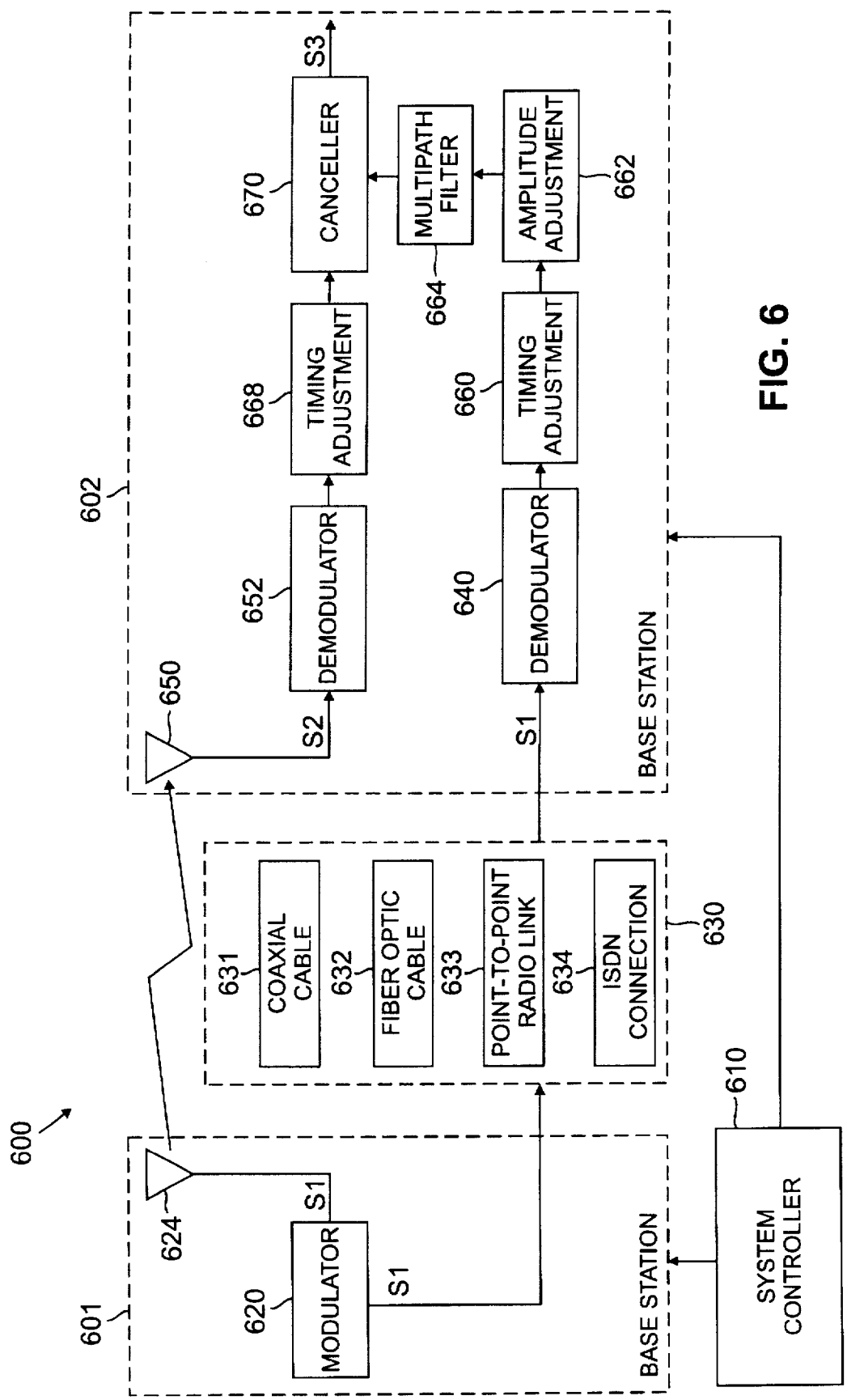
FIG. 6 is a block diagram of an exemplary communication system with CCI signal cancellation in accordance with the present invention.

FIG. 6 is a block diagram illustrating an exemplary embodiment of the present invention. A cellular communication system 600 includes a first base station 601 and a second base station 602. It will be assumed herein that base stations 601 and 602 are neighboring FR cell base stations which are susceptible to the mixed CCI described previously in conjunction with FIGS. 4 and 5. A system controller 610 directs the operation of base stations 601 and 602 in a known manner. The controller 610 allocates uplink and downlink frame slots in the base stations, and otherwise coordinates communication between the base stations and the mobile users.

Base station 600 is shown communicating a signal S1 on a downlink to a user in a corresponding system cell. The downlink includes a modulator 620 which modulates a coded baseband signal onto an appropriate carrier frequency to provide the downlink signal S1. The coded baseband signal may represent speech, text, video or other information received at the base station from a public telephone network, and subsequently processed in a speech coder and a channel coder in a manner well-known in the art. The downlink signal S1 is applied to an omnidirectional antenna 624 and thereby transmitted to a mobile user. System controller 610 directs the coding, modulation and transmitting operations of the base stations 601 such that downlink information is transmitted to a given user from antenna 624 in the appropriate frame slot.

The downlink signal S1 transmitted from antenna 624 represents an interfering signal in base station 602 in accordance with the above-described mixed CCI scenario. The base station 601 therefore separately transmits a cancellation signal along a transmission path 630 to the second base station 602. In this embodiment the cancellation signal corresponds to the interfering downlink signal S1. The transmission path 630 may be a wired connection, such as a coaxial or fiber optic cable 632, a point-to-point radio links 633 at a suitable frequency or a dial-up ISDN connection 634. It should be noted that the transmission path 630 may alternatively be any connection that carries a cancellation signal suitable for use in an interference reduction operation in the second base station. The cancellation signal S1 is received in the base station 602 and demodulated in a demodulator 640. Although in this embodiment the cancellation signal is equivalent to the transmitted downlink signal S1, alternative cancellation signals may be used in other embodiments. For example, the cancellation signal may be the coded or uncoded baseband signal corresponding to the actual transmitted signal S1, or a digital data signal which identifies various parameters of signal S1 such that a suitable representation of the interfering signal can be generated in base station 602. The interference canceller of the present invention could thus, for example, be adapted for intermediate-frequency (IF) operation as well as baseband operation. In both of these exemplary cases, the cancellation signal transmitted over path 630 and the received composite signal may be processed in the same frequency band at the receiving base station 602.

The base station 602 receives via an omnidirectional antenna 650 a composite signal S2 which includes as one component an uplink communication from a mobile user. The signal S2 also includes a mixed CCI component corresponding to the signal S1 transmitted from antenna 624 in base station 601. The composite signal S2 is supplied to a demodulator 652 which recovers the coded baseband signal.

The output of demodulator 640 is applied to a timing adjustment element 660, which in this embodiment is configured to provide a fixed delay timing equalization between the demodulated cancellation signal S1 received over path 630 and the demodulated S1 component of the composite signal S2. Any of a number of suitable delay elements could be used to provide the proper timing adjustment. The element 660 may include, for example, selectable delay lines or other known types of variable delay devices. Signal synchronization techniques could also be used. The demodulated cancellation signal is then amplitude adjusted in element 662, filtered in multipath filter 664, and applied to a signal canceller 670. It should be noted that alternative embodiments of the signal processing elements in base station 602 may utilize internal feedback. For example, a measurement of the interfering signal path from base station 601 to base station 602 may be taken when no mobile users are transmitting, and then used to set the parameters of timing adjustment element 660, amplitude adjustment element 662 and multipath filter 664.

The canceller 670 also receives the demodulated composite signal S2 from demodulator 652. A second timing adjustment element 668 may be placed in the composite signal path, to facilitate timing equalization between the composite and cancellation signals. Second timing adjustment element 668 may be used in conjunction with element 660 or may be the primary timing adjustment in a system without a cancellation signal path timing adjustment element 660. Canceller 670 combines the composite and cancellation signals such that the mixed CCI component present in the received S2 signal is cancelled, substantially reduced, or otherwise completely or partially offset. Output signal S3 from canceler 670 thus corresponds to the desired mobile-to-base uplink signal with little or no mixed CCI. Canceller 670 may be a differential amplifier or other suitable signal subtraction circuit. Other alternative signal cancellers include analog or digital signal combining circuits or devices operating at RF, IF or baseband frequencies.

Multipath filter 664 is configured to alter the demodulated cancellation signal such that it more closely resembles the demodulated mixed CCI component of the composite signal S2. The mixed CCI component will generally exhibit signal variations resulting from multipath reception of that component at base station 602. Multipath filter 664 produces corresponding signal variations in the demodulated cancellation signal and thereby enhances the effectiveness of the signal cancellation operation in canceller 670. Because base stations generally have a fixed location, the multipath signal effects of the interfering signal path between each pair of base stations could be premeasured and used to determine appropriate parameters for filter 664 in a known manner. An exemplary multipath filter suitable for use with the present invention is a linear, tapped delay line. Additional detail on linear multipath filters can be found in, for example, "Mobile Radio Communication", R. Steele, ed., Pentech Press, 1992, which is incorporated by reference herein. Although shown in FIG. 6 within interfered-with base station 602, in other embodiments the filter 664 and other signal processing elements in the cancellation signal path could be located in interfering base station 601.

Although the above description assumes that downlink antenna 624 and uplink antenna 650 are omnidirectional, the present invention is not so limited. The embodiment of FIG. 6, for example, could utilize directional antennas and a suitable frame time slot organization, in order to reduce the number of potential interferers. Exemplary arrangements of directional antennas include four 90° antennas, three 120° antennas, and the like. These and other directional antenna configurations, and their corresponding frame time slot organizations, are described in greater detail in the above-cited U.S. Pat. No. 5,594,720. The embodiment of FIG. 6 could also utilize a conventional directional antenna arrangement in which time framing is not coordinated between different antenna sectors.

As noted above, alternative embodiments of the invention may utilize regeneration of the interfering signal at the second base station 602. In such an embodiment, the transmitted cancellation signal comprises, for example, timing and signal information sent in analog or digital form over the transmission path 630 from the first base station 601 to the second base station 602. At the second base station, the interfering signal or a suitable representation thereof is reconstructed or otherwise regenerated using the transmitted information. The cancellation is then carried out in the manner described previously. It should be noted that in such an embodiment the cancellation signal transmission path 630 transmits a representation of the interfering signal suitable for use in a cancellation operation. This representation may take the form of various signal-identifying data with or without timing information.

The cancellation signal transmission path 630 may be part of an existing base-to-base wired or non-wired interconnection. For example, many microcellular systems include wired connections between base stations to facilitate system control. These existing connections could be used to carry a cancellation signal.

In many practical system implementations, it may be desirable to limit the use of the above-described signal cancellation to certain interferers. For example, in a seven-cell hexagonal pattern as shown in FIG. 5, the cancellation feature could be provided only for those interferers known to generate the greatest amount of interference. This subset may include first-tier interferers as well as interferers in other tiers. The base stations which include signal cancellation capability may thus be determined on a case-by-case basis in accordance with the design characteristics and performance goals of the system.

The term "cancellation signal" as used herein is intended to include any signal which is supplied along the transmission path 630 from the first base station to the second base station, and used in the second base station to reduce the effects of interference on a received signal. It should be noted that the cancellation signal itself may be applied directly to the signal canceller 670, or the cancellation signal may be processed in elements such as demodulator 640, timing adjustment 660, amplitude adjustment 662 and multipath filter 664 as shown in FIG. 6 and the resulting processed version of the cancellation signal supplied to the canceller 670. Furthermore, in embodiments in which multipath filter 664 or other cancellation signal processing elements are located in the first base station 601, instead of in the second base station 602 as shown in FIG. 6, it should be understood that the resulting signal supplied over path 630 is still referred to herein as a cancellation signal. The cancellation signal of the present invention is thus any signal transmitted along path 630 and utilized in the second base station in an interference-reducing operation. As noted above, there are numerous ways in which the cancellation signal may be processed to provide the desired reduction in interference.

As noted above, system controller 610 directs slot assignment and therefore can determine when mixed CCI will occur at a particular base station. The system controller 610 therefore can determine when and where to send the above-described cancellation signal. The controller may also provide other features designed to reduce or limit the effects of mixed CCI. For example, the controller could implement a non-uniform quality service in which users paying a higher usage fee are assigned a more favorable slot position in a PSTDD frame. As another feature, the system could be directed to drop a stronger downlink packet from base station 601 if, for example, a mobile user transmitting an uplink packet to base station 602 is paying a higher usage fee. Furthermore, full or partial circular interleaving of slots could be implemented by the system controller in order to reduce the run length of packets experiencing mixed CCI, as described in U.S. patent application Ser. No. 08/364,367 entitled "Time-Division Multiple Access Cellular Communication With Circular Interleaving and Reduced Dropped-Packet Runlengths," which is assigned to the assignee of the present invention and incorporated by reference herein.

The system controller 610 may include a suitably-programmed digital computer or microprocessor, an application-specific integrated circuit, or any combination of software, hardware and firmware capable of providing the desired control functions. Additional details regarding transmission, modulation, coding, and control information suitable for use with the present invention may be found in, for example, W. C. Wong, C-E. W. Sundberg and N. Seshadri, "Shared Time Division Duplexing: An Approach to Low Delay, High Quality Wireless Digital Speech Communications," IEEE Trans. Veh. Tech., November 1994, which is incorporated herein by reference.

The present invention provides a number of techniques for reducing mixed CCI in a multiple access system. Alternative embodiments include frequency-division multiplexed (FDM) systems in which a slot allocated to a user represents one of a number of available carrier frequencies. An example is a shared frequency-division duplexing (SFDD) system. In such FDM embodiments, similar signal cancellation arrangements may be used, and the time frame may be considered a frequency frame. A frame slot herein is thus intended to include, for example, both time and frequency slots. The above teachings can therefore be readily adapted by those skilled in the art to provide suitable signal cancellation such that mixed CCI in an FDM system is substantially reduced.

As noted above, the present invention may be utilized in systems with a variety of different cell patterns. Additional details regarding frequency reuse and cell patterns may be found in, for example, V. H. MacDonald, "The Cellular Concept," Bell System Technical Journal, Vol. 58, No. 1, pp. 15–41, January 1979, which is incorporated by reference herein, and "Mobile Radio Communications," R. Steele, ed., Pentech Press, 1992.

Although the above description illustrates the utility of the present invention primarily in terms of a cellular network incorporating an STDD multiple access technique, it should be understood that the apparatus and methods of the present invention are generally suitable for use with any wireless communication system in which mixed or regular co-channel interference arises. Many variations may be made in the arrangements shown, including the cell pattern and type of frequency reuse, the number and type of antennas, the type of cancellation signal used and the manner in which the interference reduction is carried out using the cancellation signal.

We claim:

1. An apparatus for communicating information in slots of a frame in a system including a first base station adapted to communicate with users in a first cell, the first base station generating an interfering signal, the apparatus comprising:

a second base station adapted to communicate with users in a second cell, the second base station receiving the interfering signal from the first base station as an interference component of a received composite signal, wherein the composite signal also includes an uplink information signal from a user in the second cell; and a cancellation signal transmission path between the first base station and the second base station for supplying a cancellation signal representative of the interfering signal from the first base station to the second base station, wherein the cancellation signal is utilizable in the second base station to offset the interference component of the received composite signal.

2. The apparatus of claim 1 further including a signal combining circuit in the second base station for combining the cancellation signal with the received composite signal.

3. The apparatus of claim 2 wherein the cancellation signal is processed in a multipath filter prior to combination with the received composite signal, wherein the multipath filter is adapted to produce multipath variations in the cancellation signal corresponding to multipath variations in the interference component of the received composite signal.

4. The apparatus of claim 2 wherein the cancellation signal is adjusted in amplitude and timing prior to combination with the received composite signal.

5. The apparatus of claim 1 wherein the cancellation signal is a digital signal representative of one or more parameters of the interfering signal.

6. The apparatus of claim 1 wherein the cancellation signal corresponds to a baseband information signal modulated onto the interfering signal in the first base station.

7. The apparatus of claim 1 wherein the cancellation signal transmission path includes a coaxial cable.

8. The apparatus of claim 1 wherein the cancellation signal transmission path includes a fiber optic cable.

9. The apparatus of claim 1 wherein the cancellation signal transmission path includes a point-to-point radio link.

10. The apparatus of claim 1 wherein the cancellation signal transmission path includes an ISDN connection.

11. A method for communicating information in slots of a frame in a system including a first base station associated with a first cell and generating an interfering signal corresponding to a downlink signal transmitted to a user in the first cell, and a second base station associated with a second cell receiving the interfering signal from the first base station as an interference component of a received composite signal, wherein the composite signal also includes an uplink information signal from a user in the second cell, the method comprising the steps of:

transmitting a cancellation signal representative of the interfering signal from the first base station to the second base station; and utilizing the cancellation signal in the second base station to offset the interference component of the received composite signal.

12. The method of claim 11 wherein the step of utilizing the cancellation signal further includes combining the cancellation signal with the received composite signal.

13. The method of claim 12 wherein the cancellation signal is processed in a multipath filter prior to combination with the received composite signal, wherein the multipath filter is adapted to produce multipath variations in the cancellation signal corresponding to multipath variations in the interference component of the received composite signal.

14. The method of claim 12 wherein the cancellation signal is adjusted in amplitude and timing prior to combination with the received composite signal.

15. The method of claim 11 wherein the cancellation signal is a digital signal representative of one or more parameters of the interfering signal.

16. The method of claim 11 wherein the cancellation signal corresponds to a baseband information signal modulated onto the interfering signal in the first base station.

17. A method for communicating information in slots of a frame comprising the steps of:

providing a first base station associated with a first cell and adapted to transmit a downlink signal to a user in the first cell;

providing a second base station associated with a second cell and adapted to receive an uplink signal from a mobile user in the second cell;

determining dynamically if the downlink signal from the first base station interferes with reception of the uplink signal in the second base station; and controlling the signal transmission in at least one of the first and second base stations on an ongoing basis to reduce the likelihood that the downlink signal will interfere with the uplink signal.

18. The method of claim 17 wherein the step of controlling the signal transmission further includes the step of assigning a user in the second cell a frame slot position less susceptible to interference from the downlink signal.

19. The method of claim 17 wherein the step of controlling the signal transmission further includes the step of directing the first base station to drop a packet of the downlink signal when a mobile user in the second cell is transmitting an uplink packet of the uplink signal in the same frame slot.

20. The method of claim 17 wherein the step of controlling the signal transmission further includes the step of providing a circular interleaving of packet slot assignments in the first and second base stations.

21. An apparatus for communicating information in slots of a frame in a system including a first base station adapted to communicate with users in a first cell, the first base station generating an interfering signal, the apparatus comprising:

a second base station adapted to communicate with users in a second cell, the second base station receiving the interfering signal from the first base station as an interference component of a received composite signal, wherein the composite signal also includes an uplink information signal from a user in the second cell; and a cancellation signal transmission path between the first base station and the second base station for supplying a cancellation signal representative of the interfering signal from the first base station to the second base station, wherein the cancellation signal is utilizable in the second base station to offset the interference component of the received composite signal; and a system controller directing an operation of the first and second base stations and implementing a service in which a user in the second cell is assigned a frame slot position less susceptible to the interfering signal.

22. An apparatus for communicating information in slots of a frame in a system including a first base station adapted to communicate with users in a first cell, the first base station generating an interfering signal, the apparatus comprising:

a second base station adapted to communicate with users in a second cell, the second base station receiving the interfering signal from the first base station as an interference component of a received composite signal, wherein the composite signal also includes an uplink information signal from a user in the second cell;

a cancellation signal transmission path between the first base station and the second base station for supplying a cancellation signal representative of the interfering signal from the first base station to the second base station, wherein the cancellation signal is utilizable in the second base station to offset the interference component of the received composite signal; and a system controller directing an operation of the first and second base stations and implementing a service in which the first base station is directed to drop a downlink packet of the interfering signal when a user is transmitting an uplink packet of the uplink information signal in the same frame slot to the second base station.

23. An apparatus for communicating information in slots of a frame in a system including a first base station adapted to communicate with users in a first cell, the first base station generating an interfering signal, the apparatus comprising:

a second base station adapted to communicate with users in a second cell, the second base station receiving the interfering signal from the first base station as an interference component of a received composite signal, wherein the composite signal also includes an uplink information signal from a user in the second cell;

a cancellation signal transmission path between the first base station and the second base station for supplying a cancellation signal representative of the interfering signal from the first base station to the second base station, wherein the cancellation signal is utilizable in the second base station to offset the interference component of the received composite signal; and a system controller implementing a circular interleaving of frame slot assignments in the first and second base stations.

24. A method for communicating information in slots of a frame in a system including a first base station associated with a first cell and generating an interfering signal corresponding to a downlink signal transmitted to a user in the first cell, and a second base station associated with a second cell receiving the interfering signal from the first base station as an interference component of a received composite signal, wherein the composite signal also includes an uplink information signal from a user in the second cell, the method comprising the steps of:

transmitting a cancellation signal representative of the interfering signal from the first base station to the second base station;

utilizing the cancellation signal in the second base station to offset the interference component of the received composite signal; and directing an operation of the first and second base stations to implement a service in which a user in the second cell is assigned a frame slot position less susceptible to the interfering signal.

25. A method for communicating information in slots of a frame in a system including a first base station associated with a first cell and generating an interfering signal corresponding to a downlink signal transmitted to a user in the first cell, and a second base station associated with a second cell receiving the interfering signal from the first base station as an interference component of a received composite signal, wherein the composite signal also includes an uplink information signal from a user in the second cell, the method comprising the steps of:

transmitting a cancellation signal representative of the interfering signal from the first base station to the second base station;

utilizing the cancellation signal in the second base station to offset the interference component of the received composite signal; and directing an operation of the first and second base stations to implement a service in which the first base station is directed to drop a downlink packet of the interfering signal when a mobile user in the second cell is transmitting an uplink packet of the uplink information signal in the same frame slot.

26. A method for communicating information in slots of a frame in a system including a first base station associated with a first cell and generating an interfering signal corresponding to a downlink signal transmitted to a user in the first cell, and a second base station associated with a second cell receiving the interfering signal from the first base station as an interference component of a received composite signal, wherein the composite signal also includes an uplink information signal from a user in the second cell, the method comprising the steps of:

transmitting a cancellation signal representative of the interfering signal from the first base station to the second base station;

utilizing the cancellation signal in the second base station to offset the interference component of the received composite signal; and providing a circular interleaving of frame slot assignments in the first and second base stations.

* * * * *